J. P. BURNHAM.
BELT-FASTENERS.
No. 181,035. Patented Aug. 15, 1876.
Fig. 1.
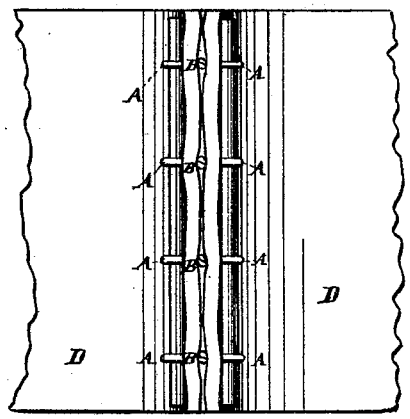
Fig. 2.
Fig. 3.   Fig. 4.
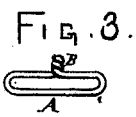   
Fig. 5.
Fig. 6.
ATTEST:
O. H. Adix
William M. Goggin
INVENTOR:
John P. Burnham,
By G. L. Chapin
Atty

UNITED STATES PATENT OFFICE.

JOHN P. BURNHAM, OF CHICAGO, ILLINOIS.

IMPROVEMENT IN BELT-FASTENERS.

Specification forming part of Letters Patent No. 181,035, dated August 15, 1876; application filed June 19, 1876.

*To all whom it may concern:*

Be it known that I, JOHN P. BURNHAM, of Chicago, in the county of Cook and State of Illinois, have invented a new and useful Improvement in Belt-Fastener, of which the following is a specification:

The object of the present invention is to improve the link and rod fastener shown in the patent to G. W. Drake, April 24, 1860.

The nature of the invention consists in a link, formed with a central projection, which passes between the laps of the belt and holds the link in place in one end of the belt while the links are being placed in the other end thereof.

A material difficulty has been experienced in uniting the ends of belts, in consequence of the links pushing back after one end of the belt has been linked and rodded, and when linking and rodding the other end.

My improvement remedies this difficulty, so that when one end of the belt has been provided with the fastener the links are firmly locked, so that their opposite ends may be pushed or driven through the other end of the belt quickly, and without loosening the bar first inserted.

A difficulty in the use of round rods to bind the joint is, that they will work loose. I remedy this difficulty by the use of rods somewhat flattened, and with the thin edge of the rod placed against the belt. In this case the rods bed into the belt far enough to hold fast when the straightening of the joint bends the outer bars of the link inward and shortens them, as the whole is to be hereinafter fully described and shown.

In the drawings, Figure 1 is an outside view of the ends of the belt, fastened by my improved device; Fig. 2, an edge view of one end of a belt, showing the rod and links therein, preparatory to inserting the links in the other end of the belt. Fig. 3 shows the link as it is before the belt-joint is straightened. Fig. 4 shows the link removed after the belt-joint has straightened on it. Fig. 5 shows a link cut from solid metal. Fig. 6 is an enlarged end view of the rod, showing the sides flattened.

In practice, the links A may be made of strong wire, (steel wire being the best,) and the projection or stop formed by twisting the ends of the wire, as shown, or they may be cut from suitable metal in the form shown in Fig. 5.

The rods C may be made of any good wire which will bear the flattening at the sides, as shown.

The ordinary slots to receive the proper number of links are formed in the ends of the belt D, after which the slots at one end of the belt are filled with links, the stops B bearing against the inside of the belt. A rod, C, is then put through the ends of the links with its thin edge bearing against the outside of the belt. The links now being locked fast, their opposite ends are to be put through the slots in the other end of the belt, and a rod put through the ends of the links in the same manner as the first rod. The straightening of the joint will then bend the links in the form shown in Figs. 2 and 4, and embed the rods in the belt, so as to hold them fast.

Other forms of rods may be used, but I deem those described to be the best.

I claim and desire to secure by Letters Patent—

The links A, provided with projections or stops B, in combination with the rods C, as and for the purpose set forth.

JOHN P. BURNHAM.

Witnesses:
O. H. ADIX,
G. L. CHAPIN.